April 20, 1954     J. KOLBE     2,676,031
INWARD BANKING VEHICLE WITH SHOCK ABSORBER CONTROL
Filed April 24, 1948     6 Sheets-Sheet 4
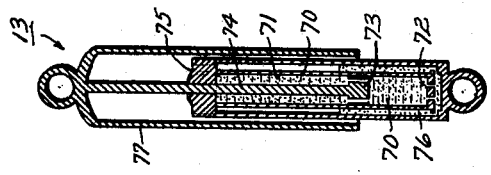
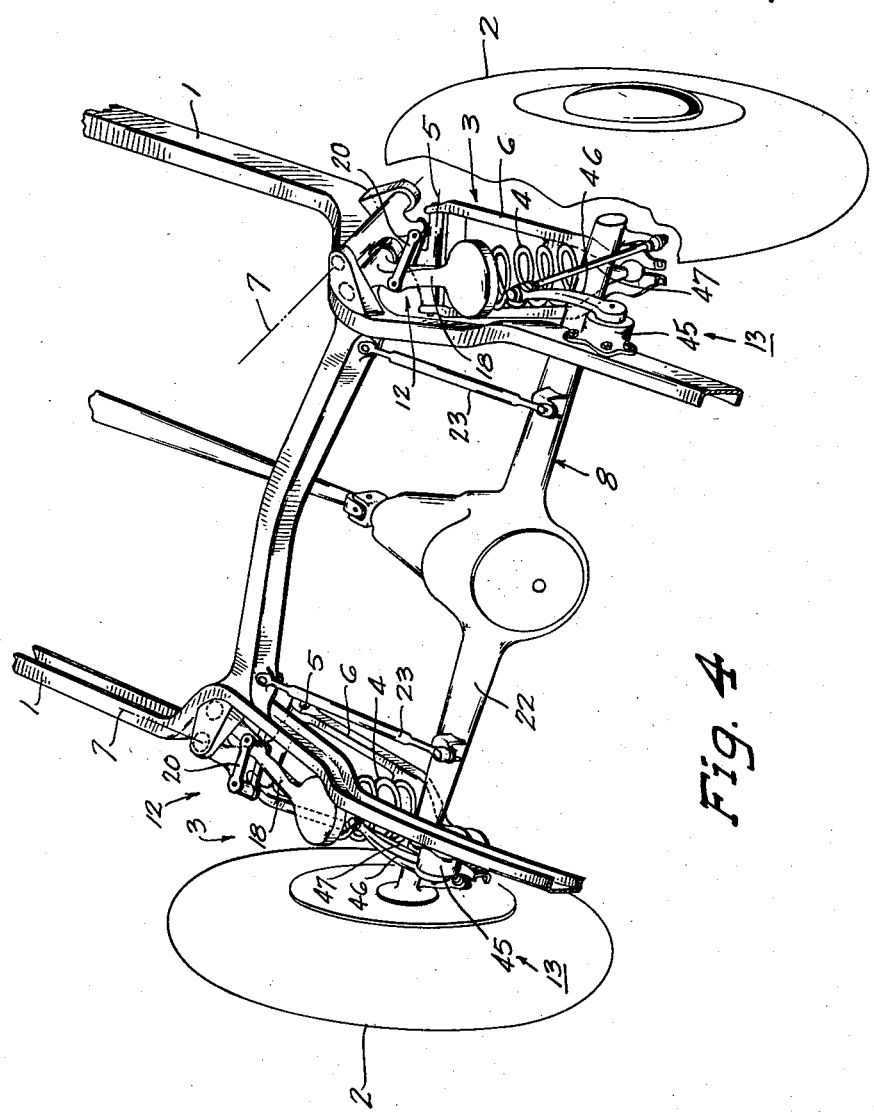
Inventor
Joachim Kolbe
By
Attorneys

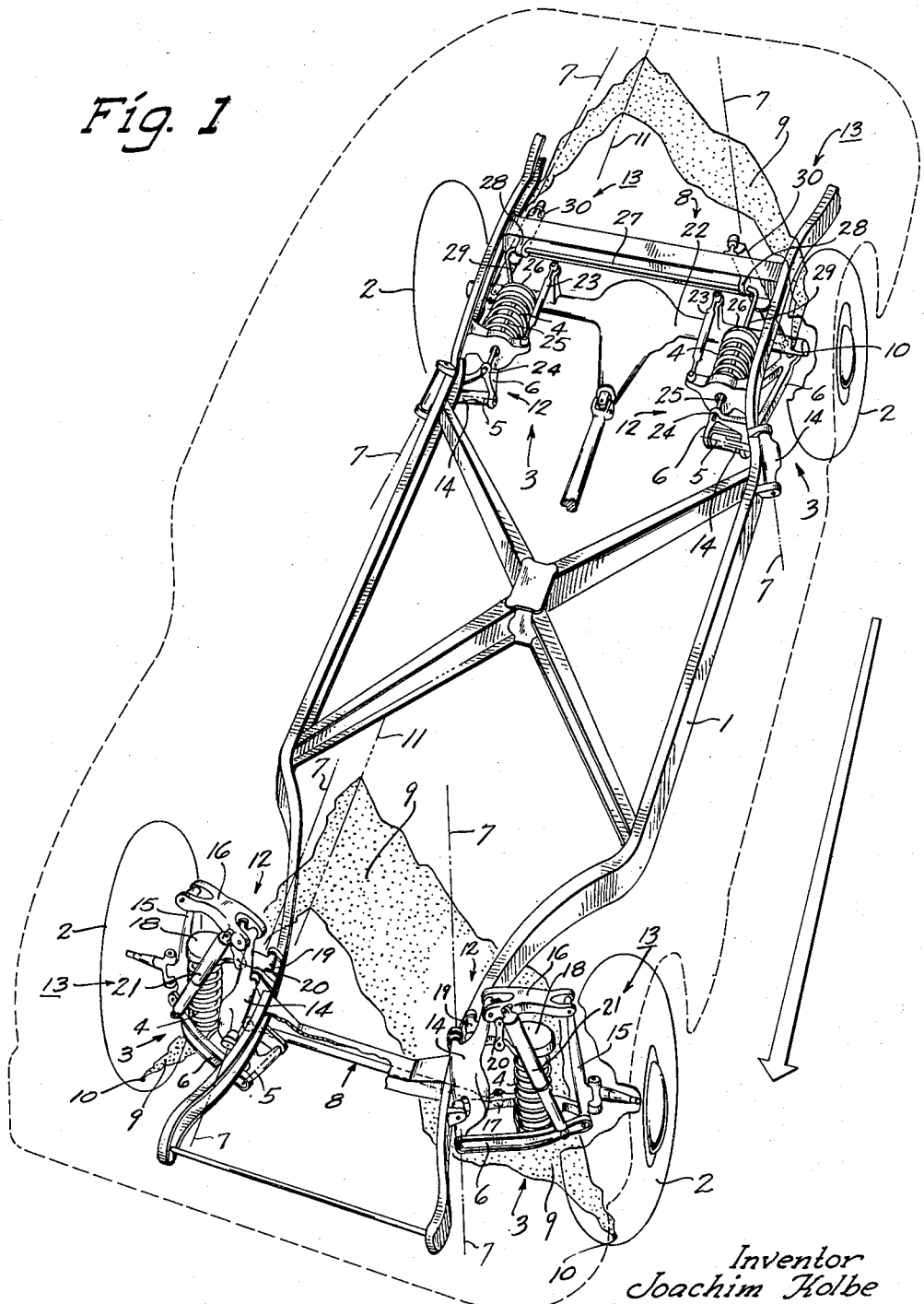

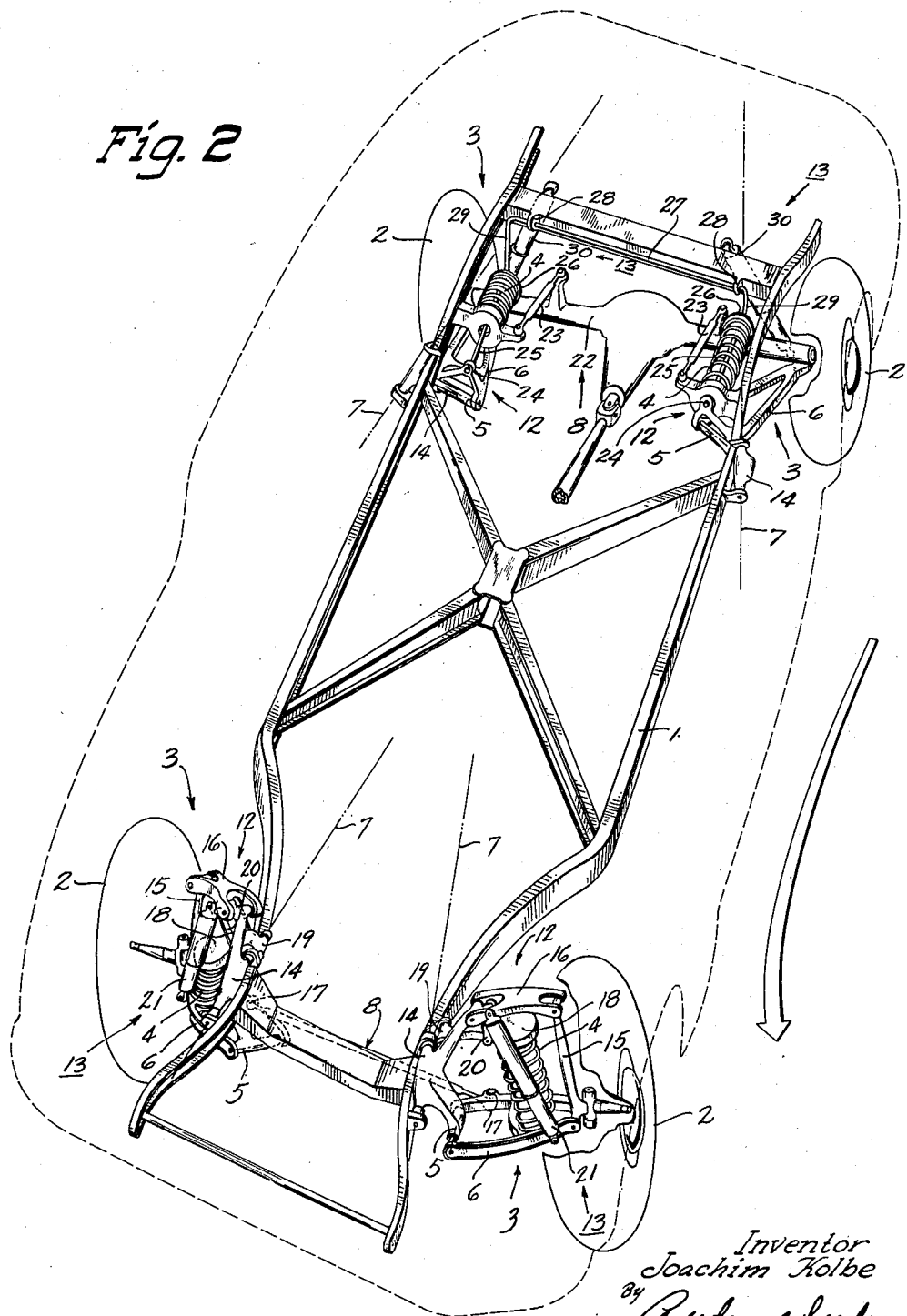

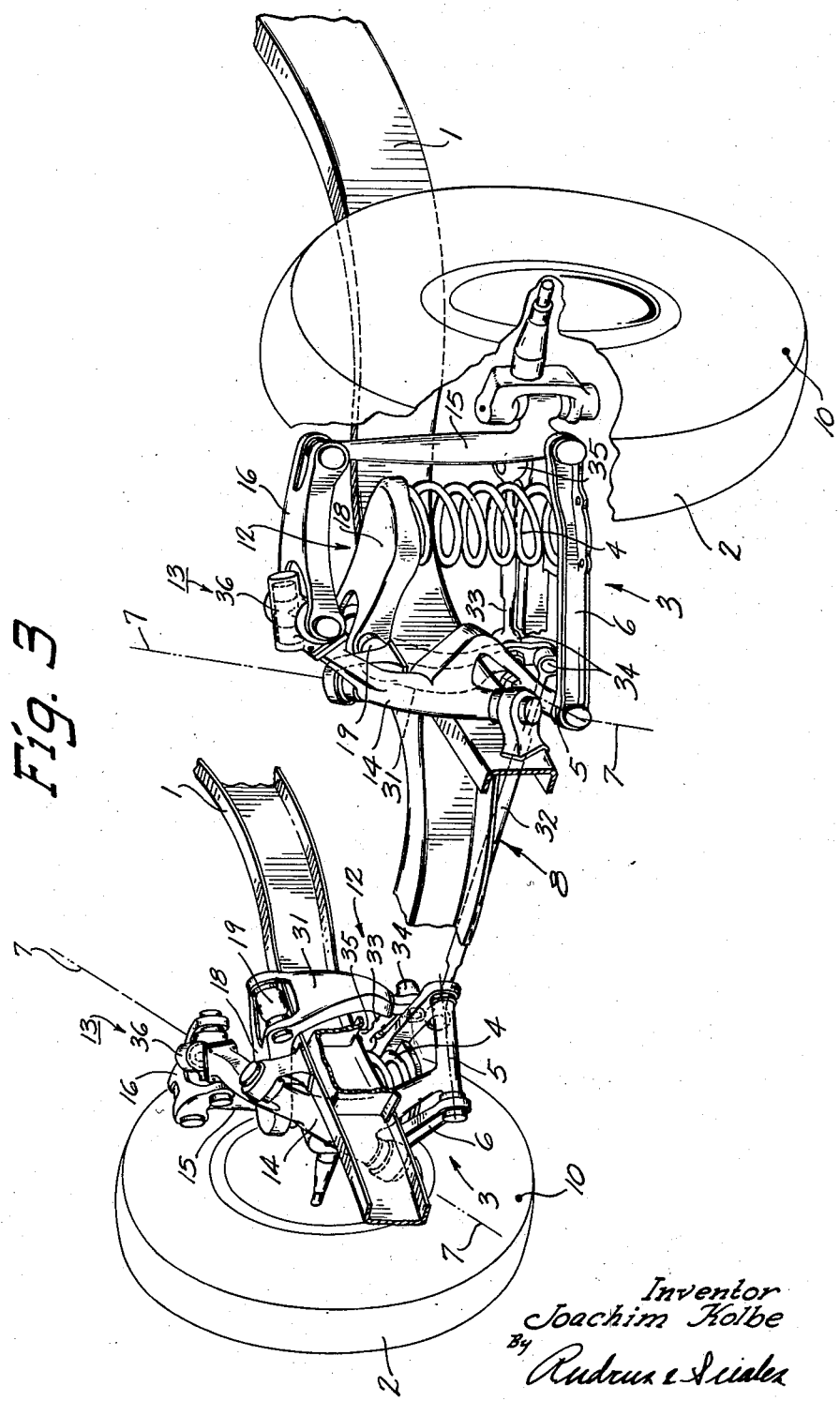

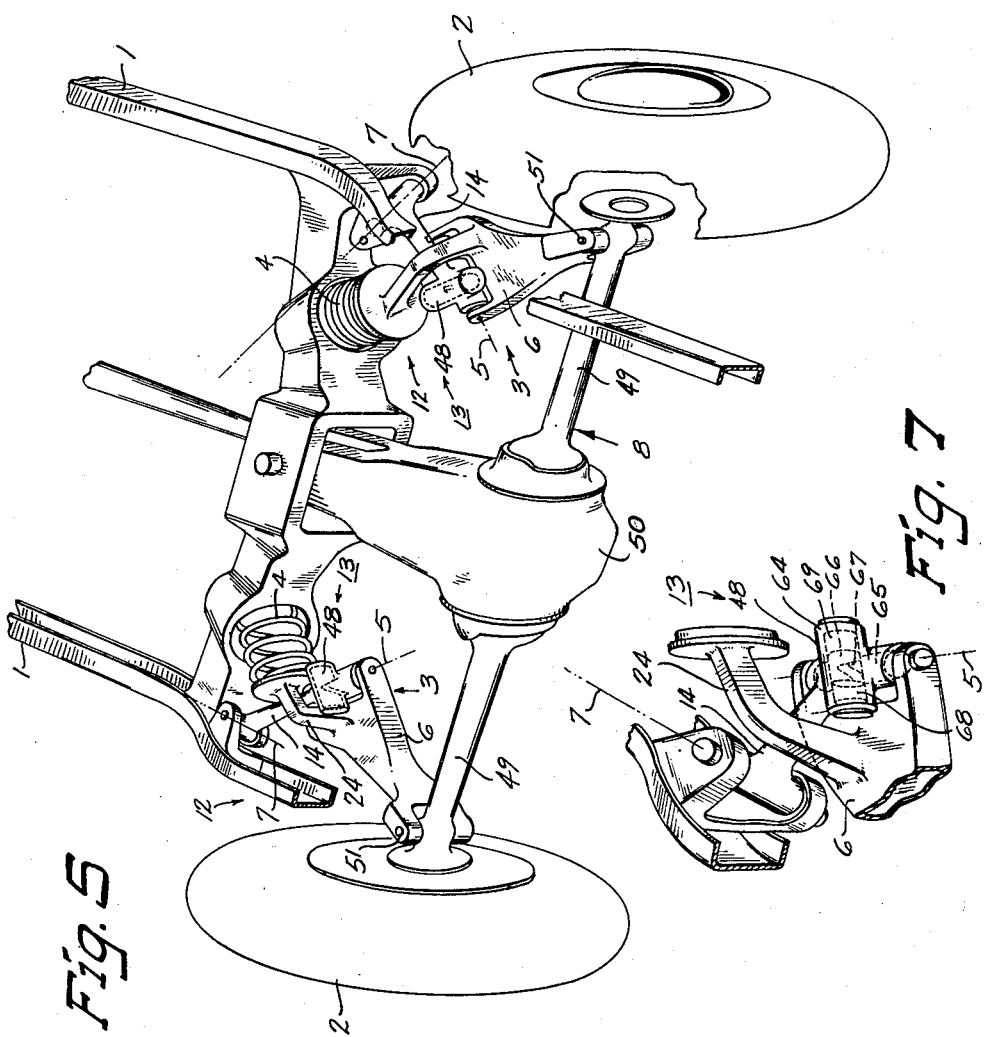

April 20, 1954 J. KOLBE 2,676,031
INWARD BANKING VEHICLE WITH SHOCK ABSORBER CONTROL
Filed April 24, 1948 6 Sheets-Sheet 6

Inventor
Joachim Kolbe
By Andrus & Starke
Attorneys

Patented Apr. 20, 1954

2,676,031

UNITED STATES PATENT OFFICE 2,676,031

INWARD BANKING VEHICLE WITH SHOCK ABSORBER CONTROL

Joachim Kolbe, Sussex, Wis.

Application April 24, 1948, Serial No. 23,066

19 Claims. (Cl. 280—112)

This invention relates to inward banking vehicles with shock absorber action for the purpose of greatly improving the banking obtained.

The present application constitutes a continuation in part of application Serial No. 642,264, filed January 19, 1946, now abandoned, and a continuation in part of the following applications: Serial No. 724,062, filed January 24, 1947, now Patent No. 2,576,686, dated November 27, 1951; Serial No. 742,496, filed April 19, 1947, now Patent No. 2,657,067, dated October 27, 1953; Serial No. 522,269, filed February 14, 1944, now abandoned; and Serial No. 635,268, filed December 15, 1945, now abandoned.

The invention relates more specifically to an improvement in banking vehicle constructions described and claimed in the copending applications above referred to and in which the superstructure of the vehicle is supported upon a plurality of pairs of interconnected banking arms to effect inward banking of the superstructure on turns.

The banking arms are of the general construction referred to in the above applications Serial No. 724,062 and Serial No. 742,496, and in which each banking arm extends between the superstructure and the road or an effective road contact point, and embodies both a complete oscillation mechanism providing for vertical movement of the outer end of the banking arm relative to the superstructure and a banking connection between the arm and the superstructure effecting a turn of the entire banking arm relative to the superstructure about a banking axis.

The principal object of the present invention is to more effectively control the relative action between the oscillation mechanism and the banking connection whereby a greater degree of banking is obtained under given conditions of turn and speed.

Another object of the invention is to provide more freedom in movement of the turn about the banking axis than of the turn about the oscillation axis.

Another object of the invention is to effect an earlier turn about the banking axis than that about the oscillation axis during banking, whereby a more rapid banking action and return from banking to neutral position is obtained.

Another object is to provide for more nearly equal banking effects between the front and rear ends of the superstructure while employing banking arms at the front which are different in length or which have a different overall banking action than those in the rear.

Another object is to provide a vehicle in which the vertical oscillation between the wheels and superstructure is substantially reduced for general variations in road levels, and the effectiveness of the oscillation mechanism is retained for any part of the road which is rough and choppy having sharp variations in road levels.

According to the invention the operation of the oscillation mechanism is resisted during banking as by the use of a shock absorber constituting in effect a part of the banking arm, and which may be disposed to provide any desired relative resistance to both oscillation and banking.

The invention is illustrated in the accompanying drawings in which:

Figure 1 is a perspective view of a banking vehicle in normal upright position and in which telescopic shock absorbers are arranged according to the invention;

Fig. 2 is a similar view showing the superstructure of the same vehicle in a banked position as on a turn;

Fig. 3 is a perspective view of a front end of a banking vehicle in which piston shock absorbing means are arranged inside the banking arms to resist the vertical oscillation of the wheels only;

Fig. 4 is a perspective view showing the rear end of a vehicle in which banking arms are extending between a rigid axle and the superstructure and rotationally operated shock absorbing means are arranged according to the invention;

Fig. 5 is a view similar to Fig. 4 wherein the banking arms comprise pendulum axles and piston shock absorber means according to the invention;

Fig. 7 is an enlarged detail view of the piston shock absorber, as shown in Fig. 5 for the left rear wheel; and Fig. 8 is a sectional view of a telescopic shock absorber of the type incorporated in the structures shown in Figs. 1 and 2.

Figure 6:
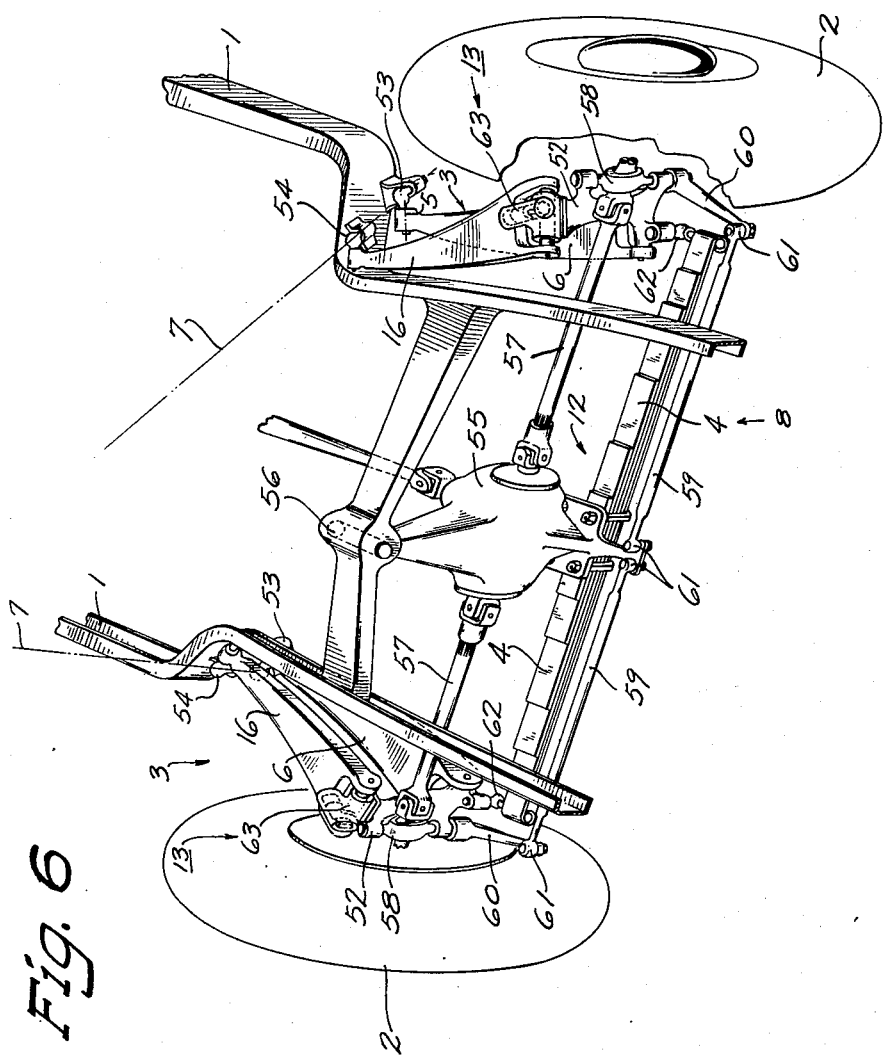
Fig. 6 is a similar view of a rear end construction showing a form of the invention with piston shock absorbers arranged for fully independently suspended drive wheels.

The invention makes it possible to greatly extend the practical designs for obtaining inward banking on turns and thereby broadens the scope of the banking arms as described in copending application Serial No. 724,062. The invention may utilize the principle of dual spring operation applied to banking arm structures as set forth in copending application Serial No. 742,496 by the present inventor.

For the purpose of this application the definition of a banking arm as contained in the first application referred to above is as follows: "A vehicle banking arm as employed in this specification and in the claims is defined as that part of the supporting structure of a counter banking vehicle constituting one of at least a pair of interconnected supports between the superstructure and either the road or a rigid axle, comprising a universally movable joint at one end guided in its banking movement relatively to the opposite end of the arm structure in effect by an inclined hinge at said opposite end to thereby move along a predetermined path whereby the plane of the arm containing the center of the universally movable joint and the inclined hinge axis intersects the median vertical longitudinal plane of the superstructure in static position in a line passing substantially above the center of gravity of that part of the superstructure supported by said pair of supports at the point of intersection of the line with a transverse vertical plane containing the universally movable joints of the pair of supports, said banking arm structure constituting also the vertical oscillation mechanism for guiding the superstructure for vertical oscillation upon the road or rigid axle; and said universally movable joint being furnished by the tire to road contact in the case of an independent wheel suspension.

A more detailed description of both banking arms and dual spring operation will be given in the description of the various embodiments of the invention as applied to automobiles illustrated in the accompanying drawings.

The structures illustrated comprise a superstructure 1 indicated by a frame structure and supported by a plurality of wheels 2 disposed in laterally spaced pairs on opposite sides of the superstructure and connected thereto by wheel or axle carriers 3. Each pair of carriers 3 constitutes a set, by which a wheel axle or a pair of wheels is secured to the superstructure. In the constructions illustrated one set is employed at each end of the vehicle and each set is supporting the superstructure 1 upon a single pair of wheels. Each carrier embodies a suitable cushion means 4 mounted to bridge a vertical oscillation pivot line 5 for the carrier arm 6, thereby cushioning vertical oscillation of the wheel 2. Each wheel carrier 3 is connected to the superstructure 1 to turn about a skew banking hinge line 7. Each set of carriers is interconnected by a tie structure 8, which might take the form of one or more tie rods or might be represented by a rigid wheel axle or the available means such as a leaf spring, as described hereafter.

As set forth in copending application Serial No. 724,062, each banking arm extends between the skew banking hinge line 7 and the road or its equivalent. For independent wheel suspensions the banking arm includes the entire carrier and wheel structure as well as the resilient means and its operating mechanism, as described hereafter. It further includes in effect the shock absorbing means as arranged according to this invention. As shown in Fig. 1, each banking arm may be considered as a plane 9 containing the banking hinge line 7 and the effective road contact point 10 of the banking arm. The two planes 9 for any given pair of arms intersect in a line 11 which may be called the motion center line for the arms and which at all times passes above the level of the effective center of mass for the corresponding portion of the superstructure being supported by the arms at a height sufficient to secure an effective lever for lateral forces acting upon the center of mass to achieve the banking turn about the motion center and necessary stability for the vehicle both in straight ahead travel and during banking.

In the structures illustrated in the drawings, Figs. 1 to 8, the cushion means 4 embodied into each carrier 3 provides for cushioning of the vertical oscillation of each wheel for the purpose of giving a soft ride to the superstructure on rough roads. It is disposed to interfere with the vertical oscillation of the wheel, bridging the vertical oscillation pivot line 5 for the carrier 3. It also is actuated by a spring operating mechanism 12 to interfere with the banking arm turn about the banking hinge line 7. The difference in leverage ratio for the operation of the cushion means 4 during the turn of the banking arm about its hinge line 7 as compared to the turn of the vertical oscillation of the wheel and its effect on the vehicle is set forth in my copending application Serial No. 742,496 referred to above, wherein various structures for operation of the cushion means are disclosed.

The operation of the cushion means both during oscillation of the wheel and during banking of the superstructure, referred to above as dual spring operation, will result in a controlled length of the banking arm.

Where shock absorbing means are interposed between the wheel carrier and the superstructure to regulate the resistance and timing of the vertical wheel oscillation, a strong influence is exerted on the timing of the wheel oscillation relative to the superstructure. In banking vehicles of the class described the shock absorbing means can be additionally employed for control of length of the banking arm. By arranging the shock absorbing means in such a manner that they aid the banking action they can have a decisive influence in the actual design of a banking arm.

A retarding or resistance mechanism 13 therefor is shown in all figures arranged in a manner so as to constitute in effect a part of the banking arm. An arrangement might be preferred whereby only the vertical oscillation of the wheels is interfered with by the retarding means. In this case no interference with the turn of the banking arm about its effective banking hinge line by the retarding means 13 will occur and the banking hinge line 7 will at all times be the effective banking hinge line if the dual spring operation is designed so as to retain the banking arm length constant during the banking of the superstructure. The retarding means will allow a free turn of the banking arm about the banking hinge line 7 while resisting a rapid movement of the oscillation mechanism of the wheel carrier, which otherwise would deform itself, as in automobiles of present day construction, subtracting thereby from the amount of banking obtainable for a given banking arm under momentary steering changes.

Where the retarding means are arranged to resist to a certain degree the banking of the superstructure besides controlling the oscillation of the wheel, a leverage ratio for the banking arm action and the spring operation has to be worked out in accordance with the additional resistance designed for the banking arm against turn about its banking hinge line. Greater resistance by the retarding means has to be compensated for by less resistance resulting from either banking arm geometry, or dual spring operation, or both. Where space requirements allow only limited sizes for the operating members constituting the banking arm, an arrangement of the retarding means according to the invention might still secure a desired degree of banking.

In the vehicle illustrated in Figs. 1 and 2 the front wheel carriers 3 constitute an independent wheel suspension. Each carrier comprises a banking hinge support member 14 to which the lower suspension arm 6 is pivotally connected by means of the horizontal pivot 5. The member 14 is pivotally connected to the superstructure to turn about the banking hinge line 7. The kingpin support 15 is pivoted to the outer end of suspension arm 6 and pivotally carries the kingpin and its corresponding wheel spindle. A second suspension arm 16 extends above and substantially parallel to arm 6 and is pivoted to the banking hinge support member 14 and to the kingpin support 15 to provide a parallelogram action for vertical oscillation of the wheel.

The tie structure 8 extending between the pair of banking arms comprises a single tie rod connected by means of ball and socket joints 17 to the lower suspension arms 6 to prevent or keep in acceptable limits the change in spacing of the road contact points.

The cushion means 4 in the front of the vehicle illustrated in Figs. 1 and 2 are shown as vertically extending coil springs. Each spring is supported by the lower suspension arm 6 and its upper end is operated during banking of the superstructure by the spring operating mechanism 12, which comprises a spring actuating lever 18 fulcrumed on the superstructure 1 by pivotal joint 19 and which is connected to be actuated by the banking hinge support member 14 by means of a shackle 20 therebetween.

A retarding or resistance means 13 is arranged inside the corresponding arm and constitutes a part of the wheel carrier 3. In the structure illustrated the means 13 constitutes a telescopic fluid shock absorber 21 which is pivotally connected to the lower suspension arm 6 near its outer end and to the upper suspension arm 16 near its inner end to be operated during oscillation of the wheel 2. During banking of the superstructure both the upper and lower ends of the shock absorber 21 turn about the banking hinge line 7 as part of the whole banking arm, thereby maintaining the length of the shock absorber or varying it only to the degree to which a change of length is designed into the banking arm during the banking turn.

Referring to the rear end construction of Figs. 1 and 2, the rigid wheel axle 22 constitutes the tie structure 8 for the pair of rear banking arms. The carrier 3 of each banking arm is connected to the superstructure by means of a banking hinge support member 14 to which the suspension arm 6 is pivotally connected by means of the horizontal pivot 5. The member 14 is pivotally connected to the superstructure to turn about the banking hinge line 7.

An upper support rod 23 is pivotally connected at one end to the superstructure 1 and at the other end to the axle housing of the rigid rear axle 22 and cooperates with the suspension arm 6 to maintain the rear axle upright.

The cushion means 4 for the banking arm is shown in the rear as a horizontally extending coil spring. Each spring is supported by a bracket attached to the superstructure 1 and operated by the spring operating mechanism 12 which comprises a bell crank lever 24 upwardly extending from the suspension arm 6 and pivotally secured to a rod 25 extending axially through the spring 4 and operating the same by a plate 26 bearing against the free end of the spring. The lever 24 is disposed to actuate the spring 4 both for vertical oscillation and for banking, as described in the copending application Serial No. 742,496 previously referred to.

A transversely extending torsion spring 27 is supported by bearings 28 near both ends and which are attached to the frame of the superstructure 1. Each end of torsion spring 27 is bent downwardly to constitute a lever 29 which is pivotally connected to the spring operating rod 25 to provide for guiding of the rear end of the corresponding coil spring 4 both during oscillation and during banking. The torsion spring is free of torque during the normal upright position of the superstructure and during equal oscillation movement of both wheels in the same direction. It will exert torque resistance against oscillation of one wheel relative to the other and will exert increased resistance while the wheels oscillate in opposite directions or during banking turn of the superstructure 1.

A retarding or resistance mechanism 13 is provided in the structure illustrated in the form of telescopic fluid shock absorbers 30 pivotally attached at their lower ends to the housing of the rear axle 22 and at their upper ends to the superstructure 1 on opposite sides of the vehicle. The upper point of attachment for each shock absorber 30 is located near the banking hinge line 7 for the corresponding banking arm, while the lower point of attachment is located near to the effective road contact point 10 of the corresponding banking arm. The effective road contact point 10 for each banking arm in the structure illustrated is a universally movable joint connecting the corresponding suspension arm 6 with the housing of the rear axle 22.

During banking of the superstructure the movement of the effective road contact point 10 relative to the superstructure may be considered a true arc having the corresponding banking hinge line 7 as its central axis. The banking of the superstructure, therefore, will not change the length of the telescopic shock absorber. Any turn of the suspension arm 6 about the oscillation axis 5, however, will be resisted by the shock absorber both during banking and during normal wheel oscillation.

The shock absorbers in the front of the vehicle illustrated cooperate with the shock absorbers in the rear to resist spring operation by the oscillation mechanism and thereby facilitate the desired operation of the spring by the banking mechanism.

The construction illustrated in Fig. 3 shows a front suspension similar to that illustrated in Figs. 1 and 2 including all parts of the wheel carrier 3 such as the lower suspension arm 6, the banking hinge support member 14, the kingpin support member 15 and the upper suspension arm 16. It varies from Figs. 1 and 2 in that the spring operating mechanism 12 and the tie structure 8 are combined to control both the variation in the length of the springs 4 and of the distance between the effective road contact points 10. For this purpose the spring actuating lever 18 on each side of the vehicle is provided with a downwardly extending arm 31 to form a bell crank. A center tie rod 32 and a corresponding outer tie rod 33 on each side of the vehicle are connected by means of ball and socket joints 34 to the lower ends of the corresponding arms 31. The outer end of each tie rod 33 is connected by means of a ball and socket joint 35 to the outer end of the suspension arm 6 or any point on or near the kingpin support member 15.

A retarding means 13 comprising a piston type fluid shock absorber 36 is carried by the banking hinge support member 14 on each side of the vehicle and operated by the oscillation of the corresponding upper suspension arm 16. The shock absorber 36 will turn about the banking hinge line 7 during the banking of the superstructure 1 without being operated by this turn since both the piston and its container are arranged inside the banking arm.

The rear banking arm structure illustrated in Fig. 4 embodies a spring operating mechanism 12 similar to that applied to independently suspended wheels as shown for the front end of the vehicle illustrated in Figs. 1 and 2. The vertically extending coil spring 4 for each banking arm is operated during oscillation from the suspension arm 6 and during banking from the spring actuating lever 18 which by means of shackle 20 stresses the spring on the curve outside and releases the spring on the curve inside during the turn of the hinge support member 14 about the banking hinge line 7. The rigid rear axle is kept upright by the upper suspension rod 23 connecting the same to the frame by suitable ball and socket joints.

A retarding means comprising shock absorber 45 of the rotary hydraulic type with oscillating rotary piston blade is operated by a horizontally extending lever 46 which in turn is actuated by means of an inclined rod 47 having its upper end pivotally connected to the lever 46 and its lower end pivotally connected to the housing of the axle 22 preferably near the outer end of the latter. The actuating rod 47, if extended, should intersect the banking hinge line 7. The inclination and length of the operating rod 47 will determine the amount of shock absorber action resisting the banking turn compared to the normal action resisting oscillation of the wheels 2.

The construction of Fig. 5 employs a piston operated shock absorber 48 constituting the retarding mechanism 13 and which is attached to the hinge support 14 which connects the inner end of the banking arm to the superstructure 1. The shock absorber 48 is operated by oscillation of the wheel 2 and its corresponding suspension arm 6 only. A turn of the banking arm about its banking hinge line 7 will not be resisted by the shock absorber. The resilient cushion means for the banking arm consists of the coil spring 4 interposed between the bell crank lever 24 and the superstructure and is stressed both by relative upward and lateral movement of the corresponding wheel towards the superstructure to secure dual spring operation.

The banking arm in the construction illustrated, which is of the pendulum axle type, includes the pendulum half axle 49, the housing of which is pivotally attached at its inner end to the differential housing 50 and at its outer end to the lower suspension arm 6 by means of a vertically extending hinge 51. The wheel 2 is carried by the outer end of half axle 49. The differential housing 50 is carried by the superstructure 1 in a manner to allow it to remain intermediate the wheels, while the superstructure moves laterally into a banked position. The construction is similar to banking arm arrangements described in my copending application Serial No. 769,161, filed August 18, 1947.

In the construction illustrated in Fig. 6 the invention is shown as applied to a banking arm structure in which the suspension arms form the principal part of the banking arms thereby eliminating the banking hinge support member, for independently suspended rear drive wheels. Such banking arms are described in my copending application Serial No. 14,480, filed March 12, 1948, now Patent No. 2,580,559, dated January 1, 1952, and Serial No. 638,210, filed December 29, 1945, now abandoned. The vertically extending hinge support 52 connects the outer ends of the lower suspension arm 6 and of the upper suspension arm 16. Universally movable joints 53 and 54 connect the arms 6 and 16 to the superstructure and are arranged along the banking hinge axis 7. The differential housing 55 in this construction is suspended from the superstructure by means of a horizontally extending pivot 56.

A drive shaft 57 on each side of the differential housing 55 extends to a spindle bearer 58 carried by the vertically extending hinge support 52. Universal joints at both ends of the drive shaft 57 provide the necessary flexibility in the drive during movements of the wheel relative to the differential housing 55.

Each wheel 2 is shown to be blocked against steering by means of a steering tie rod 59 extending between the differential housing 55 and a steering arm 60 on the corresponding spindle bearer 58 and connected to both by means of the respective ball and socket joints 61. A transverse leaf spring 4 supports the differential housing 55. It is operated by oscillation of the wheels 2 as well as by banking of the superstructure 1 as set forth in copending application Serial No. 742,496 referred to above, and serves in addition to keep the distance substantially constant between the outer ends of the banking arms. L-shaped shackles 62 support the outer ends of the spring and are carried by the vertically extending hinge supports 52 to allow the described oscillation and banking movements.

Each vertically extending hinge support 52 carries a piston type shock absorber 63 constituting the retarding mechanism 13 and which is operated by oscillation of the upper arm 16. The shock absorber 63 will turn with the rest of the banking arm about the banking hinge line 7, and will not interfere with the banking movement so long as the banking arm does not change in length. The shock absorber 63 directly resists any change in angular position between the suspension arms and the vertically extending hinge support member 52 that may be caused by shocks from the road effecting vertical wheel oscillation.

Fig. 7 is a detail perspective of the piston type shock absorbing means 13, illustrating the shock absorber in its relation to suspension arm 6, hinge support member 14, banking hinge line 7 and spring operating bell crank lever 24 as shown in Fig. 5. The shock absorber housing 64 is attached to the banking hinge support member 14 and contains the horizontally extending main oscillation hinge shaft 65 for the corresponding wheel 2. It further contains a piston 66 placed in a direction perpendicular to that of shaft 65 and spaced vertically from the axis 5 of the shaft 65. The housing 64 is fluid filled. A knuckle 67 attached to shaft 65 operates the piston 66 to slide inside the housing 64 increasing and decreasing the chambers 68 and 69 at opposite ends of piston 66.

A valving mechanism (not shown) regulates the amount of fluid allowed to flow from chamber to chamber under a given pressure.

Fig. 8 is a detail section taken through a fluid filled telescopic shock absorbing means 13, as shown in some of the figures. The shock absorber contains main chamber 70 divided into an upper section 71 and a lower section 72 by a piston 73. A piston rod 74 is rigidly attached to the piston and arranged to slide through the head plate 75 of the main chamber. The main chamber 70 is surrounded by a reserve chamber 76. Valving mechanism (not shown) in the piston 73 and additional valving mechanism between main chamber 70 and reserve chamber 76 regulates the flow of the fluid to achieve properly timed movement of one end of the shock absorber relative to the other. A protective dust-tube 77 is attached to the piston rod 74.

Various types of shock absorbing means may be employed in carrying out the invention, and various constructions may be employed for the type selected.

In all of the constructions a shock absorber or other retarding or resistance device is employed which cooperates with the relative leverage and forces involved to effect a control of utilization of the spring movement by the banking movement, so that a more effective initial banking is obtained. By the use of the resistance means effective against vertical oscillation of the wheel suspension it is possible to employ leverage ratios which are less favorable to banking, and thereby to meet certain types of space requirements for the banking arm. Where sufficient space is available to provide the necessary leverages for banking the question becomes one of relative cost between the leverage system required and one utilizing the shock absorbers of the present invention.

Where shock absorbers are desired for vertical oscillation purposes anyhow, the present invention disposes them in a manner to obtain the additional banking desired by limiting their relative action between oscillation and banking.

Various embodiments of the invention may be employed within the scope of the accompanying claims.

I claim:

1. In a vehicle having a superstructure supported by a plurality of pairs of interconnected banking arms to effect inward banking of the superstructure on turns, a banking arm construction employing common spring means for controlling both vertical wheel oscillation and banking movements with a leverage system for each said movement to operate the spring, and a resistance disposed solely in said vertical wheel oscillation leverage system and leaving the banking leverage system substantially free to operate at all times.

2. In a vehicle having a superstructure supported by a plurality of pairs of interconnected banking arms to effect inward banking of the superstructure on turns, a banking arm construction having vertical wheel oscillating members incorporated therein and employing common spring means for controlling both vertical wheel oscillation and banking movements, and a shock absorber operatively connected between the vertical wheel oscillation members which actuate the spring.

3. In a vehicle having a superstructure supported by a plurality of pairs of interconnected banking arms to effect inward banking of the superstructure on turns, a banking arm construction having wheel suspension members providing for vertical wheel oscillation and employing common spring means for controlling both vertical wheel oscillation and banking movements about a substantially horizontal pivotal axis for the wheel suspension and about a banking axis for the banking arm, respectively, and a shock absorber operatively connected to the wheel suspension members across said horizontal pivotal axis to retard turning at said axis while leaving the banking arm substantially free to turn relative to the superstructure at said banking axis.

4. In a vehicle in which the superstructure is supported on wheels disposed for vertical oscillation relative to the superstructure and the superstructure is disposed to turn about a center of motion above its center of mass to a banking position in response to centrifugal forces moving the center of mass laterally, a common resilient cushion means disposed to control both the vertical oscillation of the wheels and the banking turn of the superstructure, leverage systems separately actuating said common cushion means in response to vertical oscillation of the wheels and to lateral movement of the superstructure, and retarding mechanism correlated to said leverage systems and acting thereon to provide an over-all greater mechanical advantage for actuation of the cushion means in response to lateral movement of the superstructure as compared to that in response to vertical oscillation of the wheels.

5. In a vehicle in which the superstructure is supported on wheels disposed for vertical oscillation relative to the superstructure and the superstructure is disposed to turn about a center of motion above its center of mass to a banking position in response to centrifugal forces moving the center of mass laterally, a common resilient cushion means disposed to control both the vertical oscillation of the wheels and the banking turn of the superstructure, leverage systems separately actuating said common cushion means in response to vertical oscillation of the wheels and to lateral movement of the superstructure, and retarding mechanism disposed to resist operation of the vertical oscillation leverage system whereby an over-all mechanical advantage is provided for actuation of the cushion means in response to lateral movement of the superstructure as compared to that in response to vertical oscillation of the wheels.

6. A vehicle comprising a superstructure and front and rear wheels, wheel carriers connected in front and rear pairs to operate in unison, each wheel carrier for at least one of said pairs comprising a hinge support member hinged to the superstructure on an axis inclined both laterally and longitudinally of the vehicle, a wheel suspension arm hinged to the support member on an axis non-parallel to the first mentioned axis and having a movable spring operating member rigidly connected thereto and displaced from both of said axes, a compression spring interposed between said spring operating member and an element on the superstructure to be compressed by upward movement of the arm about the last mentioned axis and by movement of the arm about the first mentioned axis toward the median plane of the vehicle, and a shock absorber disposed across said second named axis to retard turning movement at said axis, whereby the superstructure is supported on the wheels and is banked inwardly in response to lateral forces thereon as in the case of centrifugal forces in manipulating curves.

7. In an inward banking vehicle having a superstructure and wheels supporting the same, resilient cushion means disposed between the wheels and the superstructure to provide for vertical oscillation of the wheels relative to the superstructure, leverage means disposed to actuate said cushion means during banking in a manner preventing interference of said cushion means with the banking action of the superstructure, and a shock absorber disposed to retard the vertical oscillation of the wheels relative to the superstructure whereby the operation of said cushion means by said leverage means is substantially free from interference by vertical oscillation of the wheels relative to the superstructure.

8. A vehicle in which the superstructure is supported by cooperating banking arms for inward banking action on turns, each banking arm of at least one set of arms being pivotally connected at its inner end to the superstructure on a banking axis and having its outer end free to oscillate vertically relative to the superstructure, tie means between the banking arms of said pair to maintain the outer ends of the arms spaced apart a substantially constant distance, resilient cushion means interposed between said banking arm and the superstructure and disposed to be operated both by the banking movement of the banking arm and by the vertical oscillation of the outer end of the banking arm, and a shock absorber disposed to retard the operation of said cushion means by said vertical oscillation movement whereby priority of action is obtained by said banking movement.

9. A vehicle comprising a superstructure and paired front and rear wheels, cooperating wheel carriers for the wheels of at least one of said pairs of wheels, each wheel carrier comprising a wheel supporting member, a suspension arm connected to the wheel supporting member by a hinged joint and connected to the superstructure by two hinged joints in series with each other, the axis of one of said two hinged joints being inclined both laterally and longitudinally of the vehicle, and a shock absorber associated with the first mentioned hinged joint to be actuated by operation thereof, said superstructure being free at all times to take an inwardly banked position on turns.

10. A vehicle comprising a superstructure and paired front and rear wheels, a wheel carrier for each of said wheels connected to the superstructure on a hinge axis inclined toward the median plane of the vehicle and toward the axis of the associated wheel, said wheel carrier comprising a substantially horizontal hinged joint, and shock absorbing means associated with said joint to be actuated by operation thereof but not by movement of the carrier about said hinge axis.

11. A superstructure banking vehicle comprising a superstructure and paired wheels, a wheel carrier for each of said wheels connected to the superstructure by universally turnable joints in spaced relation along an inclined banking axis, and shock absorbing means associated with the wheel carrier and actuated by vertical oscillation of the wheels but not by swinging movement of the carrier about said axis.

12. A superstructure banking vehicle comprising a superstructure and paired wheels, a wheel carrier for each of said wheels connected to the superstructure for swinging movement by universal joints in spaced relation along an inclined banking axis, said wheel carrier comprising a suspension arm having a hinged joint which is actuated by vertical movement of the wheel, resilient means opposing both said swinging movement and said vertical movement in one direction, and shock absorbing means associated with the carrier and opposing said vertical movement but not said swinging movement.

13. The invention defined in claim 12, wherein the shock absorbing means comprises a hydraulic double action shock absorber including a reciprocable piston.

14. A superstructure banking vehicle comprising a superstructure and paired wheels, a wheel carrier for each of said wheels comprising a member hinged to the superstructure on a banking axis inclined both laterally and longitudinally of the vehicle, upper and lower suspension arms connected to said member by hinged joints, shock absorbing means having one portion rigidly attached to said member and another portion rigidly attached to one of said suspension arms and actuated only by movement of such suspension arm about its hinged joint.

15. A vehicle comprising a superstructure and paired front and rear wheels, paired wheel carriers for said wheels connected to the superstructure on inclined axes to permit the superstructure to bank in response to lateral force, each of said carriers comprising a vertical oscillation joint operable upon change in the loading of the vehicle, a spring associated with each carrier opposing banking movement of the carrier and operation of said joint in one direction, and a shock absorber associated with each carrier opposing such operation of said joint without opposing said banking movement.

16. A vehicle comprising a superstructure including a source of power, front and rear wheels, front and rear wheel carriers each comprising a pair of brackets spaced on opposite sides of the median plane of the superstructure and hinged to the superstructure with the upper end of the hinge axis of each bracket inclined toward the median plane and toward the axis of the corresponding wheel with which it is connected, and a wheel suspension for each corresponding wheel and bracket comprising an arm hinged to said bracket on an axis non-parallel to the axis of said first named hinge and supported at its outer end by said wheel, a spring seat on said arm laterally spaced from the axes of both hinges, a stationary spring seat on said superstructure, a spring disposed between said spring seats to oppose pivotal movement of said arm and bracket in one direction, and wheel shock absorbing means so constructed and arranged that said brackets are substantially unopposed in their turn relative to the superstructure, whereby the superstructure is supported on the wheels and is banked inwardly in response to lateral forces thereon as in the case of centrifugal forces in manipulating curves.

17. The invention defined in claim 16, wherein the wheel shock absorbing means include double action hydraulic shock absorbers supported by said brackets.

18. The invention defined in claim 16, wherein the wheel shock absorbing means include double action hydraulic shock absorbers including said arms hinged to said brackets.

19. A vehicle comprising a superstructure, wheels for supporting said superstructure, wheel carriers interposed between said wheels and superstructure and constructed to cooperate in providing an inward banking of the superstructure on turns and for vertical oscillation of the wheels relative to the superstructure, a common resilient means for controlling said banking action and said vertical wheel oscillation, and means to retard only said vertical wheel oscillation during the banking action to effect a control of operation of the spring by the banking action and thereby prevent initial loss in banking by reason of vertical wheel oscillation.

References Cited in the file of this patent

UNITED STATES PATENTS

| Number | Name | Date |
| --- | --- | --- |
| Re. 21,605 | Kolbe | Oct. 22, 1940 |
| 2,130,288 | Olley | Sept. 13, 1938 |
| 2,152,938 | Welch | Apr. 4, 1939 |
| 2,186,065 | Fischer | Jan. 9, 1940 |
| 2,191,211 | Krotz | Feb. 20, 1940 |
| 2,260,102 | Freret | Oct. 21, 1941 |
| 2,290,923 | Wahlberg | July 28, 1942 |
| 2,305,795 | Schieferstein | Dec. 22, 1942 |
| 2,621,919 | Utz | Dec. 16, 1952 |